UNITED STATES PATENT OFFICE.

HENRY NAPIER, OF ELIZABETH, NEW JERSEY.

IMPROVEMENT IN CURING HIDES AND SKINS.

Specification forming part of Letters Patent No. 59,251, dated October 30, 1866.

*To all whom it may concern:*

Be it known that I, HENRY NAPIER, of Elizabeth, Union county, State of New Jersey, have invented a new and useful Means for the Curing and Preparing of Hides, Skins, and Furs, and for the Production of Leather; and I do hereby declare that the following is a full, clear, and exact description thereof, which will enable others skilled in the art to make and use the same.

I immerse the hide, skin, or fur in a solution of carbolic acid or of creosote, or of carbolic acid or creosote rendered alkaline in a slight degree, or in carbolic acid or creosote combined with glycerine, or in carbolic acid or creosote with the addition of an astringent metallic salt, such as the protochloride or the perchloride of iron.

The immersion is continued from five to thirty minutes according to the thickness and weight of the hide, skin, or fur under treatment. The hide, skin, or fur is then withdrawn from the liquor, which is allowed to drain from it, and is then either sun-dried or dried artificially.

The carbolic acid or creosote coagulates the animal gelatine and albumen, closes the porous texture of the skin, and in a few hours a perfect leather is produced as impervious to moisture as the best tanned leather and free from odor, with no tendency to putrefy, and uninjured in every way by the mode of treatment specified.

When fine white skins or furs are to be prepared, the solution may be made with pure carbolic acid or creosote, though common glycerine may be used with said substances. In such case the color of the skin or fur is not changed, and the skin or fur is left pliable and soft, but still completely cured and not liable to the attacks of the moth, grub, or other insects.

The solution of carbolic acid I have employed has a specific gravity of 1020, and ten minutes of immersion has sufficed for the curing of skins and furs; but the density of the liquor may be increased or diminished, and the time of immersion varied without injury to the skin or fur.

I claim as new and desire to secure by Letters Patent—

The use of carbolic acid or of creosote in any form, and either alone or in combination with each other and with other substances, such as a metallic salt, glycerine, &c., for the purpose herein set forth.

HENRY NAPIER.

Witnesses:
WM. F. MCNAMARA,
ALEX. F. ROBERTS.